United States Patent
Meyer

(10) Patent No.: US 6,347,640 B1
(45) Date of Patent: Feb. 19, 2002

(54) MULTIFUNCTIONAL VALVE FOR A VEHICLE TANK

(75) Inventor: Knut Meyer, Essen (DE)

(73) Assignee: Mannesmann Vdo AG (DE)

( * ) Notice: Subject to any disclaimer, the term of this patent is extended or adjusted under 35 U.S.C. 154(b) by 0 days.

(21) Appl. No.: 09/486,736

(22) PCT Filed: Sep. 23, 1998

(86) PCT No.: PCT/EP98/06076
§ 371 Date: Jun. 7, 2000
§ 102(e) Date: Jun. 7, 2000

(87) PCT Pub. No.: WO99/16633
PCT Pub. Date: Apr. 8, 1999

(30) Foreign Application Priority Data

Sep. 26, 1997 (DE) ......................................... 197 42 469

(51) Int. Cl.[7] ...................... F16K 17/36; F16K 31/18; B60K 15/035
(52) U.S. Cl. ...................... 137/43; 137/423; 137/202
(58) Field of Search ...................... 137/38, 39, 43, 137/202, 411, 423, 630.14

(56) References Cited

U.S. PATENT DOCUMENTS

| 4,209,032 A | * | 6/1980 | Drori ......................... 137/202 |
| 4,694,847 A | * | 9/1987 | Szlaga ......................... 137/43 |
| 4,886,089 A |   | 12/1989 | Gabrlik et al. ............... 137/202 |
| 5,392,804 A | * | 2/1995 | Kondo et al. ................ 137/202 |
| 5,443,561 A |   | 8/1995 | Sakata et al. ................ 137/202 |
| 5,511,577 A | * | 4/1996 | Richards et al. ............. 137/202 |
| 5,535,772 A |   | 7/1996 | Roetker et al. ............... 137/43 |
| 5,577,526 A | * | 11/1996 | Kasugai et al. ................ 137/43 |
| 5,687,756 A | * | 11/1997 | VanNatta et al. .............. 137/43 |
| 5,782,258 A | * | 7/1998 | Herbon et al. ................. 137/43 |

FOREIGN PATENT DOCUMENTS

| DE | 42 13 932 C 2 | 2/1994 |
| EP | 0 773 128 A2 | 5/1997 |
| JP | 404201721 | * 7/1992 ................. 137/202 |
| WO | WO 97/21561 | 6/1997 |

* cited by examiner

Primary Examiner—John Rivell
Assistant Examiner—Ramesh Krishnamurthy
(74) Attorney, Agent, or Firm—Richard A. Speer; Mayer, Brown & Platt

(57) ABSTRACT

According to the invention, in the case of a multifunctional valve for a vehicle container, comprising a first opening which can be closed by means of a first closing body as a function of the filling level of the container and is intended for ventilating the tank as it is being filled, a second opening which can be closed by means of a second closing body and is intended for ventilating the tank during operation, the two closing bodies automatically going into their closing position if the vehicle takes up an excess sloping position or undergoes a roll-over action, the two closing bodies (13, 18) can be brought into the closing position by a respectively assigned first or second float body (11, 17) which are of lower density than the medium in the container, and in the event of a roll-over action, a mechanical device (ball 19) acts upon the two float bodies (11, 17) to counter their buoyancy and keep the closing bodies (13, 18) in the closing position.

6 Claims, 1 Drawing Sheet

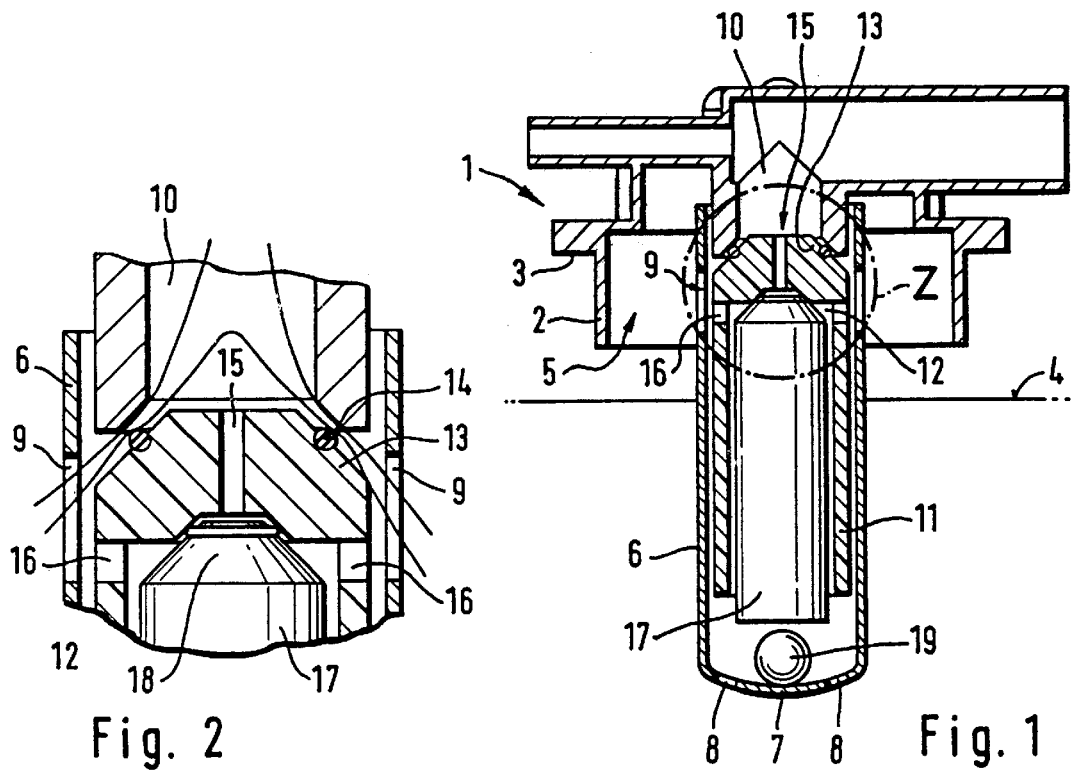
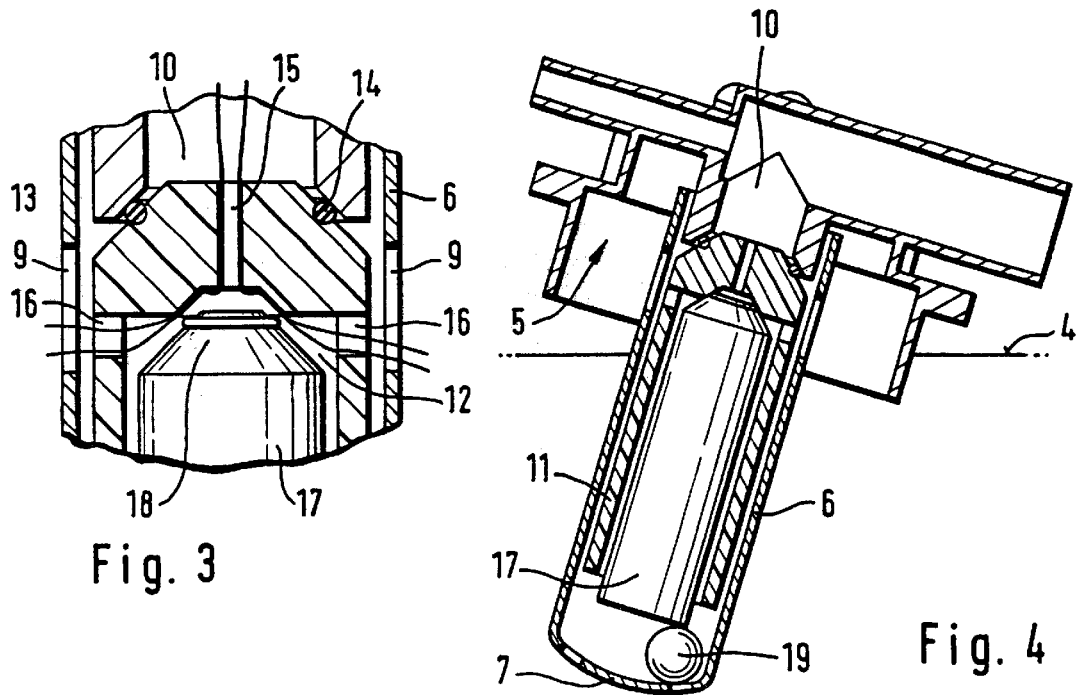

MULTIFUNCTIONAL VALVE FOR A VEHICLE TANK

BACKGROUND OF INVENTION

The invention relates to a multifunctional valve for a vehicle tank having the features of the preamble of patent claim 1.

An appropriate valve has already been disclosed, which valve can be mounted in the cover of a vehicle tank and combines at least the following functions in one sub-assembly:

Ventilating the tank as it is being filled and protecting it against overfilling by building up a counter pressure, Aeration while fuel is being removed during operation, Protecting the tank against overload in the event of an excessive build up of pressure, Closing in the event of the vehicle taking up an excessive sloping position or rolling over.

As a fuel tank is being filled, the flowing fuel causes a mixture of air and fuel vapors to be displaced. This mixture initially flows through a large ventilation opening to an activated carbon filter which retains the fuel parts and allows essentially purified air to pass into the surroundings. In the case of the known valve, said, large ventilation opening is assigned a flap which, on the one hand, is pretensioned resiliently into its closing position but, on the other hand, is held open by a buoyancy body in the normal position of the vehicle. As filling increases, the buoyancy body, whose density (1.2) is clearly higher than that of the fuel (0.7), becomes more and more submerged in the fuel. The volumetric buoyancy of the buoyancy body alone causes the force ratio between its own effective weight and the force of the abovementioned closing spring to change, with the result that said closing spring closes the flap before the level of the tank has reached its maximum height.

Parallel in liquid terms to the large opening, the valve is furthermore provided with an additional, substantially smaller opening which likewise serves for ventilation during operation, i.e. for the escape of fuel vapors as pressure is building up in the tank during the journey or while the vehicle is at a standstill. This small opening has also to be closed if there is a further rise in the fuel so that no liquid fuel can get into the ventilation duct. The opening is therefore assigned a valve body which is likewise pretensioned into the closing position with a relatively weak spring and is held open by the weight of a buoyancy body (density likewise greater than the fuel density). The small opening is then finally also to be closed according to the same principle as in the case of the large opening. For safe operation of the tank it is important for a gas pocket always to be maintained above the liquid fuel as a buffer for pressure fluctuations.

In conjunction with the springs, the high density of the buoyancy bodies ensures that the two openings are securely closed in the event of the vehicle taking up an excessive sloping position or rolling over, because the weight or descending force of the buoyancy bodies is then added to the respective closing spring force. If the buoyancy bodies were designed in the specified configuration as floats, in the event of the vehicle rolling over they would lift the flap or the valve body off from the opening cross-sections counter to the spring force, with the result that the tank would not be sealed at these openings.

In the case of the known valve, however, very hesitant filling of the tank may finally also cause the gas pocket above the liquid level to be completely dissipated via the small aeration opening and the tank to be completely filled with liquid. In particular, the valve body closes only at an already very high level, the assumption obviously having been made from this that a sufficient counter pressure has already been built up in the tank due to the throttle resistance of the small opening. This may result in the tank being overfilled.

Furthermore, the second opening is arranged to one side of the larger, first opening, with the result that the sub-assembly which is inserted in the form of a cover into a recess in the tank cover, altogether needs a relatively large amount of space.

However, with regard to reliable sealing, the aim is to keep such recesses as small as possible.

Finally, the sub-assembly furthermore comprises a pressure relief valve which should protect the tank against damage in the event of a sharp rise in pressure. This essentially comes into operation whenever the temperature of the fuel in a full tank sharply rises and the pressure of the abovementioned gas pocket rises beyond the threshold value of the pressure relief valve. However, in the case of a tank which has already been overfilled, liquid fuel may also emerge.

An aeration and roll-over valve has also been disclosed, this valve comprising a bell-shaped float having a closing body, in whose downwardly open interior is maintained a gas pocket, in the event of the tank level rising, while the aeration flow may pass by the float on the outside. A ball is provided below the float, which ball in the event of a sloping or roll-over position prevails over the lifting force of the float and keeps the closing body in the closing position. A second overflow opening is not provided in this valve.

BRIEF SUMMARY OF THE INVENTION

The invention is based on the object of improving a valve of the generic type.

This object is achieved according to the invention by the defining features of patent claim 1. The features of the subclaims specify advantageous developments of this subject matter.

If the two openings can each be closed by floats bearing closing bodies, reliable closing as the liquid level rises is initially achieved therewith. For the event of rolling over, which occurs rarely, a dedicated, mechanical actuating device is provided which counteracts the buoyancy of the floats in this extreme situation, with the result that the openings can be securely closed against fuel emerging.

In a manner known per se, the actuating device may comprise at least one body whose weight is greater than the lifting force of the float bodies, and may thus apply a particularly simple solution. However, it may also comprise a further float, a deflection mechanism being connected to the further float, which mechanism transmits the lifting force of the further float, in the event of rolling over, to the two float bodies to counter their lifting force.

In each case, it is particularly advantageous if the two float bodies are jointly retained by a single device in the closing position of their assigned closing bodies. This in turn may be achieved in a particularly space-saving manner if the two openings and the floats are assigned coaxially to one another.

The second opening may be provided in a space-saving manner in the first float body if the latter is, for example, of bell-shaped design and forms a guide for the second float body. This also fulfills the requirement for the entire valve to have a lateral extent which is as small as possible.

Delayed closure of the second opening can be effectively ensured by the second float being lifted up more slowly than the first one. This is achieved, for example by the second float being manufactured from a material of a somewhat higher density.

Again in a space-saving manner, the two float bodies may be guided in a cup-shaped guide which has a conical or concavely curved bottom and the interior of which communicates with the container by liquid. The shape of the bottom then forms the rolling guide for the abovementioned weight body for closing the two ventilation openings.

The roll-over action is particularly functionally reliable, even over prolonged periods of use, if a ball is arranged between the bottom and the lower side of the float bodies, the diameter of which ball is matched to the bottom and to the distance of the lower side of the float bodies from the bottom in a manner such that the two closing bodies are brought mechanically into the closing position before the ball moves laterally to bear against the guide. This reliably avoids the ball jamming and also undesirable development of noise. As the ball is constantly wetted by fuel as it rolls along the downwardly curved bottom, the friction between its surface and the lower side of the float body is also negligible.

A float valve is thus available which allows the tank to be aerated and ventilated, protects the tank against excessive pressure and overfilling, has a submerged tube switch-off (build-up of a sufficient counter pressure as the tank is being filled to automatically switch the fuel nozzle off after the permissible level is reached) and includes a roll-over action.

The valve consists of a double float (external and internal floats), which floats, depending on the level, successively close the filling and operating vents and open them again as the level drops.

A roll-over ball is arranged below the floats, which ball, in the event of the tank being in any sloping or roll-over position, overcomes the lifting forces of the floats and closes the valve.

Further ventilation is not provided.

Further details and advantages of the subject matter of the invention emerge from the drawing of an exemplary embodiment and the subsequent, detailed description thereof in the following.

BRIEF DESCRIPTION OF THE DRAWINGS

In a simplified representation

FIG. 1 shows a section through a multifunctional valve having two coaxially arranged float bodies in a completely closed position, FIG. 2 shows a detail from FIG. 1, in which a first (ventilation) opening of the valve is opened, FIG. 3 shows a detail from FIG. 1, in which a second (aeration) opening of the valve is opened, FIG. 4 shows a sectional view of the valve according to FIG. 1, but with the vehicle standing on a slope, the two openings being closed by means of a mechanical device.

DETAILED DESCRIPTION OF THE INVENTION

According to FIG. 1 a multifunctional valve 1 is formed in a holder 2 which can serve as the lid of an opening in the cover of a container (not shown), for example of a fuel tank of a vehicle. The holder 2 rests with a flange 3 on the edge of this opening, if appropriate is latched upon it with a seal placed in between or welded to it in a pressure type manner. 4 designates a liquid level in the container.

The holder 2 forms a space 5 which is open downwards towards the container in a bell-shaped manner. A cup-like guide 6 is arranged approximately centrally in this space and is fastened to the body of the holder 2 approximately in the plane of the flange 3. The guide has a dome-shaped, concavely curved bottom 7 in which holes 8 are provided. A short distance below its upper edge the guide furthermore has large apertures 9. The upwardly open interior of the guide 6 opens into a ventilation opening 10 which is continued in the body of the holder 2.

Various ducts are formed in the holder 2 above the flange 3, which ducts lead to an activated carbon filter (not shown) for separating hydrocarbon particles out of the ventilation flow.

The holder 2 also has arranged in it a pressure relief valve (not shown here) which is known per se, likewise communicates with the contents of the container and in the event of an excessive build-up of pressure, for example caused by temperature, opens in order to prevent the container from being damaged.

In the guide 6 a first float body 11 is guided in a manner such that it can be displaced up and down rectilinearly. The float body has an approximately bell-shaped, downwardly open cross-section with a hollow cylindrical interior 12. Its upper end or the cover of the interior 12 forms a conical closing body 13 which is assigned to the ventilation opening 10 and in the closing position shown here bears in a sealing manner against the edge of the ventilation opening 10. To improve the sealing action the closing body 13 bears an elastic sealing ring 14.

An aeration opening 15 is provided in the center of the cover of the interior 12. This opening has a small cross-section and hence a defined throttle action. Apertures 16 are in turn provided below the cover, in the side walls of the first float body 11, with the result that the interior 12, in conjunction with the holes 8 in the bottom of the guide 6, is always completely pressure-balanced.

In the interior 12 of the first float body 11, a second float body 17 is guided coaxially with the first float body. At its conical, upper end it is designed as a second closing body 18—if required, likewise fitted with a sealing ring,—which corresponds with the aeration opening 15 and tightly closes the latter in the position shown here.

Between the two float bodies 11 and 17 and the bottom 7 and the side walls of the guide 6 a ball 19 is locked in in a manner such that it is capable of rolling freely. The diameter of the ball is calculated with respect to the dome-shaped bottom 7 and the distance of the two float bodies 11, 17 in their closing position such that the ball securely retains the two float bodies in the closing position before it comes to bear against the lateral edge of the guide 6 (cf. FIG. 4). This also prevents the ball from striking against the lateral edge of the guide and thus the production of undesirable noises. The ball only needs to touch the lower side of the inner float body 17, the outer float body is then indirectly raised via the second closing body.

Furthermore, the ball 19 is sufficiently heavy for its weight to reliably outweigh its own buoyancy and the lifting force of the two float bodies even in the event of the container tipping through 180°, i.e. getting into a roll-over position.

The position of the valve according to FIG. 1, in which both the ventilation opening 10 and the aeration opening 15 are closed, is automatically set at the permissible level of the container, i.e. at the maximum level of the liquid level 4, because of the buoyancy of the two float bodies 11 and 17

(filling cutout action or submerged tube switch-off). In addition, it is set in the event of the container taking up a sloping position or roll-over position (FIG. 4) (roll-over action).

The two float bodies 11 and 17 are guided in such a manner—for example, by longitudinal ribs with grooves lying between them—that a vertical balancing of pressure is always possible even along their sides. The guide 6 may also be made as a cage, for example in a manner known per se.

In the position of the valve 1 in accordance with FIG. 2, the ventilation opening 10 is opened. This is always the case if the level has dropped and there is little, if any, buoyancy at the two float bodies and also if the container is not in a sloping position as in FIG. 4. As the container is filling up and the liquid level 4 is again rising, it is possible, according to FIG. 2, for the displaced air-fuel vapor mixture to escape through the apertures 9 and the ventilation opening 10 to the activated carbon filter.

Meanwhile, the position of the second float body 17 is not of importance. However, it is designed by choice of material (density) and its deadweight such that it floats up later than the first float body. In the position shown here, the lower side of the float body 17 rests on the ball 19 and the first float body 11 is caused by its weight to be supported on the second closing body so that the ventilation opening 15 is closed.

As the liquid level 4 approaches the permissible level, according to FIG. 3 the first float body 11 then initially rises in the guide 6 and by means of its closing body 13 and the sealing ring 14 closes the ventilation opening 10. At the same time, the aeration opening 15 still, however, remains open, thereby furthermore enabling a throttled ventilation flow to escape. According to FIG. 3, this flows through the apertures 9 in the guide 6, through the apertures 16 in the first float body 11 and through the aeration opening 15 into the ventilation opening 10.

In this state, a sufficient counter pressure is already built up in the container if filling is rapid, such that no more fuel can be put into the filling nozzle. In contrast, if supply is slow the liquid level 4 can continue to rise slowly, but finally the second float body 17 also rises and with its closing body 18 also closes the aeration opening 15. This thus prevents the container from being overfilled. In this state, even if the filling is slow, no further fuel is able to flow in counter to the internal pressure of the tank.

The abovementioned pressure relief valve in any case only opens at a pressure which cannot be achieved by fuel running in in an unpressurized manner.

External air for aerating the container during operation as fuel is being removed can also flow in in the position according to FIG. 1 via a separate aeration means (for example on the tank cover).

If it is desired to dispense with the sloping position block and only to provide a pure roll-over action for the roll-over position, in place of the ball 19 it is possible also to provide a further float body (not shown) which via a tilting lever mounted on the guide 6 brings the two float bodies 11 and 17 into the closing position if the container takes up a tilting angle in the region of 180°.

What I claim is:

1. A multifunctional valve for a vehicle fuel tank comprising:
    (1) structure providing a first opening to effect primary ventilation of the tank during filling thereof;
    (2) a first float structure having,
        (a) a first closing body for effecting closing of the first opening;
        (b) a second opening extending through the first closing body providing throttled, secondary ventilation of the tank after the first opening is closed;
        (c) a float body portion of a first density which is less than the density of the fuel in the tank dependent from the first closing body and defining a hollow cylindrical interior;
    (3) a second float structure mounted for rectilinear movement within the hollow cylindrical interior of the first float structure, the second float structure having,
        (a) a second closing body for effecting closing of the second opening in the first closing body,
        (b) a float body portion of a second density which is (i) less than the density of the fuel in the tank and (ii) greater than the density of the first body float portion; and
    (4) a ball of weight sufficient to retain both the first and second closing bodies in the closing position in the event of vehicle rollover.

2. The multifunctional valve as defined in claim 1 wherein the first and second openings and the float structures are arranged coaxially, the second float structure being guided in the first float structure in a manner such that it can move linearly in the longitudinal direction.

3. The multifunctional valve as defined in claim 1 wherein the first and second float bodies are guided in a cup-shaped guide which has side walls and a concavely shaped bottom and the interior of which communicates with the fuel in the tank and the ball is free to roll on the concave bottom.

4. The multifunctional valve as defined in claim 3, wherein the ball is arranged between the bottom and the lower side of the float bodies, the diameter of the ball is matched to the bottom and to the distance of the lower side of the float bodies from the bottom in a manner such that the two closing bodies are brought mechanically into the closing position before the ball moves laterally to bear against the side walls of the guide.

5. The multifunctional valve as defined in claim 1 wherein the two closing bodies are each provided with a sealing ring.

6. A multifunctional valve as defined in claim 1 wherein the float body portion of the first float structure has openings into the hollow cylindrical interior at a location adjacent to the first closing body.

* * * * *